Figure 1:
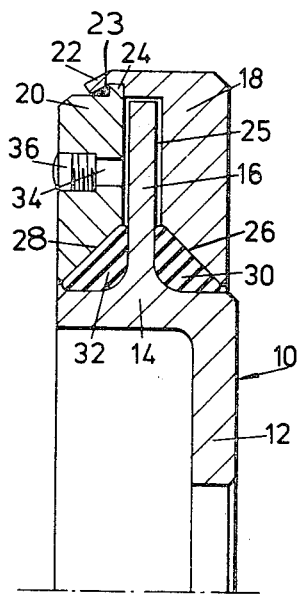

# United States Patent [19]

Hall

[11] 3,734,484
[45] May 22, 1973

[54] TORSIONAL VIBRATION DAMPER
[75] Inventor: Jeffrey Hall, Huddersfield, England
[73] Assignee: Houdaille Industries Inc., Buffalo, N.Y.
[22] Filed: Apr. 2, 1971
[21] Appl. No.: 130,736

[52] U.S. Cl.................................267/137, 267/129
[51] Int. Cl.............................................F16k 7/00
[58] Field of Search....................267/129, 137, 136

[56] References Cited
UNITED STATES PATENTS
3,186,702   6/1965   Taylor................................267/129

Primary Examiner—James B. Marbert
Attorney—Diller, Brown, Ramik & Holt

[57] ABSTRACT

The invention relates to a torsional vibration damper comprising a hub member, an inertia member comprising at least two parts and being disposed about a peripheral portion of the hub member to define a cavity and a viscous fluid disposed in said cavity, each of said two parts of the inertia member being cut away in a region adjacent the hub member, and an elastic tuning element formed from a high resilience, low hysteresis material located in each said cut away portion in such manner that each said elastic element is under both axial and radial compressive stress to locate positively said inertia member both axially and radially relative to said hub member, and also acts as a seal between said hub member and said inertia member whereby to seal said viscous fluid in said cavity.

6 Claims, 8 Drawing Figures

TORSIONAL VIBRATION DAMPER

The present invention relates to torsional vibration dampers of the type intended, for example, to be mounted on the end of the crankshaft of a reciprocating engine, such as an internal combustion engine.

Two types of torsional vibration dampers are in common use, the tuned rubber damper and the untuned viscous damper. The usual form of tuned rubber damper consists of an inertia mass coupled to a hub member by means of a rubber or other elastomeric element. The hub member is rigidly attached to the engine crankshaft. In operation the damper introduces a second mode of vibration into the system, by using the elastic properties of the rubber element as a tuning spring. The peak amplitudes of the two modes of vibration thus produced are reduced by the damping effect of the internal hysteresis of the rubber element converting the vibration energy to heat. The rubber thus performs the two functions of tuning and damping. The tuned damper of this type is advantageous in that under resonant conditions the tuned inertia mass vibrates at greater amplitudes than the input vibrations and the energy required for the damping function may be obtained from a relatively small inertia mass compared with the inertia mass of an untuned damper designed for the same system. A major disadvantage of the tuned damper incorporating rubber or elastomeric materials with high internal hysteresis values is the poor thermal conductivity of such materials which causes a build up of heat within the rubber element and consequently results in high working temperatures. These high working temperatures define the operational limits of such dampers to the relatively low input, energy level which generates the temperature within the tuning element at which it begins to lose its desired properties.

The untuned viscous damper consists of an inertia mass coupled to a housing by means of a thin film of a high viscosity liquid and the housing is rigidly attached to the engine crankshaft. The vibration amplitudes of the system are reduced by the vibration energy being absorbed and converted to heat in shearing the film of liquid between the inertia mass and housing.

The heat generated is readily dissipated to atmosphere from the large surface area of the housing. Because the inertia mass in this device is untuned its amplitude is always less than the input amplitude and it must be of relatively large mass compared with the inertia mass of a tuned damper.

According to the present invention there is provided a torsional vibration damper comprising a hub member, an inertia member comprising at least two parts disposed about a peripheral portion of the hub member to define a cavity accommodating said peripheral portion and containing a viscous fluid, each of said two parts of the inertia member being cut away in a region adjacent the hub member, and an elastic tuning element formed from a high resilience, low hysteresis material located in each said cut away portion in such manner that each said elastic element is under both axial and radial compressive stress to locate positively said inertia member relative to said hub member, both axially and radially and also acts as a seal between said hub member and said inertia member to seal said viscous fluid in said cavity.

The present invention thus provides a torsional vibration damper with rubber or elastomeric spring tuned and viscous damped inertia mass. The use of low internal hysteresis materials permits the dampers to accept higher levels of vibration energy before the build up of heat in the tuning element creates a working temperature at which the tuning element loses its desired properties. A further advantage is achieved because the tuned inertia mass vibrates at higher amplitudes than the input amplitude and the viscous damping action may thus be more effectively used with the smaller inertia mass usually associated with tuned dampers than with normal viscous dampers. Still further advantages may lie in the construction of the present damper in that manufacture and assembly may be relatively simple, and may be of low cost.

The elastic elements provide positive radial location of the inertia member by opposed compressive stresses and positive axial location by opposed compressive stresses.

Any viscous fluid may be used in the fluid chamber and the viscosity of the fluid selected will depend upon the use to which the damper is to be put. It is however envisaged that for most purposes a silicone fluid having a viscosity of up to 1 million centistokes will be used.

The materials selected for construction of the damper should be such that the damping fluid and the elastic tuning elements and hub and inertia members are inert to one another.

The preferred material from which the tuning elements are made is natural rubber although other high resilience, low hysteresis materials (generally elastomers) may be suitable. Natural rubber and some of the other elastomers however, suffer from the disadvantage that they are incompatible with silicone fluids.

This is evidence by a severe loss of viscosity of the silicone fluid when the combination is subjected to heat such as is developed during operation of the damper.

Although the construction of the damper of the invention is such that the area of tuning element exposed to the silicone fluid is relatively small, it is advisable, when using elastic elements made from materials which are incompatible with the fluid being used, to provide at least those parts of the elastic elements which will be in contact with the fluid (and preferably the whole surface) with an outer surface layer of a material inert to the fluid, e.g. chemically inert synthetic rubber. The coating may be of the order of 0.005 inches thick.

The elastic elements in addition to acting as tuning elements also serve to locate the hub and inertia members relative to each other both axially and radially and act as seals to prevent egress of viscous fluid from the drive chamber. By locating the hub member and inertia mass both axially and radially accurate control of the clearances between the hub member and inertia mass may be achieved.

If desired, the tuning elements may be bonded in position though this is not essential for location or sealing purposes.

If desired, the inertia member may be formed with a V cross-section groove so that the inertia member may serve as a pulley. The inertia of the pulley is thus not added to the hub inertia.

Where the inertia member is designed to be used as a pulley it is preferred that the tuning elements are bonded in position to withstand the additional superimposed torsional load of the driven accessory.

The invention will now be further described by way of example with reference to the accompanying drawings of which all of the FIGS. (1 to 8) show sectional views through various examples of dampers constructed in accordance with the present invention. In each case only half of the damper is shown, as the dampers are symmetrical.

Throughout the description of the drawings, like reference numerals have been used to refer to similar parts.

Referring firstly to FIG. 1, the damper shown includes a hub member, indicated generally by the reference numeral 10, comprising a central annular portion 12 having an integrally formed annular flange 14 extending from the periphery of the central portion 12 at right angles thereto. A radially extending flange 16 is formed integrally with the flange 14. An inertia member comprising two parts 18 and 20 is disposed about the flange portion 16 in concentric relationship with the hub member 10. The two parts 18,20 of the inertia mass are connected one with another by a lip portion 22 formed on one of the inertia parts 18 which is rolled over a flange portion 24 formed on the other part 20 of the inertia member to enclose a synthetic resin seal 23. (Alternatively the lip portion 22 may be rolled over and welded to the flange portion 24). The two parts of the inertia member together from a cavity 25 in which a peripheral portion 16 of the hub member 10 is accommodated. Each of the two parts 18,20 of the inertia member is cut away at 26,28 respectively in a region adjacent the angle formed between flanges 14 and 16. Elastic tuning elements 30,32 (which are O-rings when not under compression) are disposed in the cut away portions. The elastic elements are under axial and radial compressive stress and locate the inertia member both axially and radially relative to the hub member and also serve to seal the drive chamber 25. Viscous fluid may be introduced to the drive chamber 25 through opening 34 before the cap 36 is fixed in place. In operation the elastic elements 30,32 act in three ways. Firstly, they act as tuning elements, secondly they act to radially and axially locate the hub and inertia members relative to one another and thirdly they act to seal the drive chamber 25. It can be seen from FIG. 1 that the area of contact between the fluid in the drive chamber 25 and the elastic elements is small.

Where the elastic elements are however made from a material which is not inert with respect to the viscous fluid, at least that part of the elements which will be in contact with the fluid (and preferably all of the surface of the elastic elements) is provided with an outer surface layer of a material which is inert with respect to the fluid, e.g. a chemically inert synthetic rubber.

Figure 2:
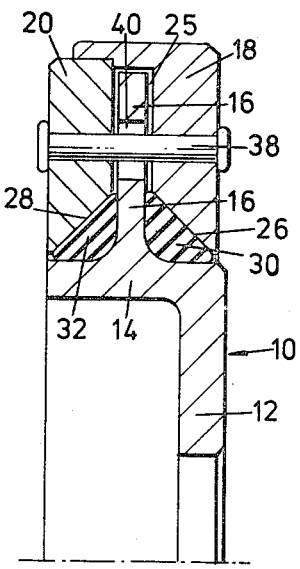

The damper shown in FIG. 2 is of similar construction to the damper of FIG. 1 with the exception that the two parts 18,20 of the inertia member are connected by rivets 38 (or bolts) which extend through the damper unit. To allow a certain amount of relative movement between the inertia member and the hub member, such as is necessary in a damping device, holes 40 in the flange 16 are oversize.

This arrangement is generally more suitable when the two parts 18, 20 of the inertia member are made from cast iron.

Figure 3:
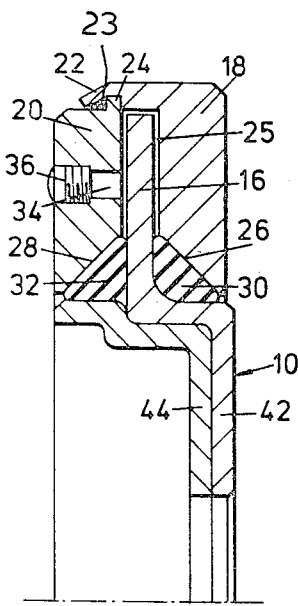

The damper of FIG. 3 is similar to that of FIG. 1 with the exception that the hub member 10 is constructed from two parts 42,44 which together form a hub member of a shape similar to that of FIG. 1.

Figure 4:
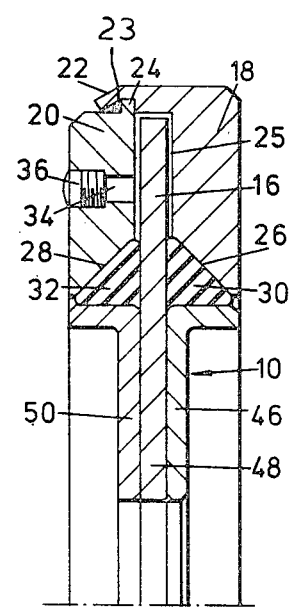

The arrangement shown in FIG. 4 is similar to that of FIG. 1 with the exception that the hub member 10 is made up from three parts 46,48 and 50. These three parts combine to form a hub member of a shape similar to that of FIG. 1 with the exception that the central portion 12 is disposed in a position symmetrical with respect to the flange 14.

Figure 5:
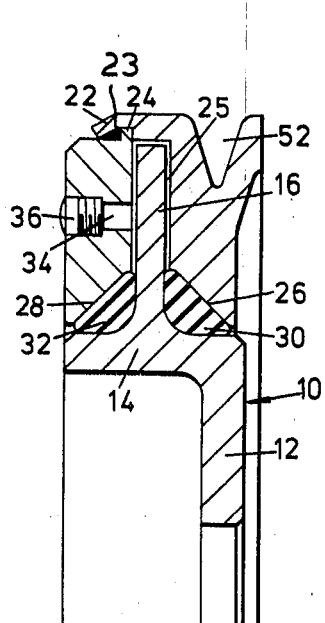

FIG. 5 shows the damper of FIG. 1 modified by the incorporation of a V cross-section channel 52 so that the inertia member may act as a pulley.

Figure 6:
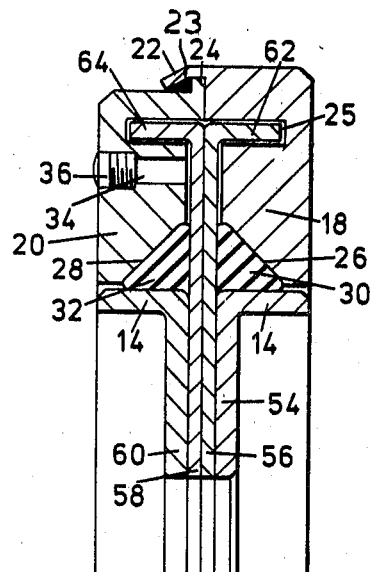

In the arrangement shown in FIG. 6 the hub member comprises four annular parts 54,56,58, 60 the inner two 56/58 of which are bent over at right angles to the periphery of the hub member 10 to form flanges 62,64. These flanges are located in correspondingly shaped annular grooves formed in the two parts 18, 20 of the inertia member. This arrangement increases the area of the hub member and inertia member which is in shear relationship.

Figure 7:
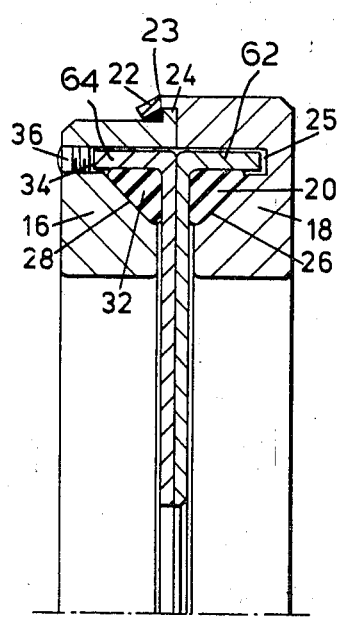

In the arrangement shown in FIG. 7 the flange 14 is omitted and the inertia members 18,20 are cut away (at 26,28) in the region adjacent the flanges 62,64. The elastic tuning elements 30,32 are located in the cut-away portions 26,28 as in the previous embodiments described.

Figure 8:
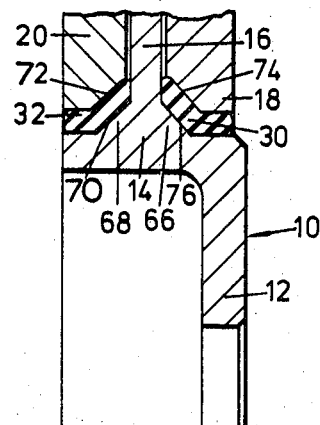

The arrangement shown in FIG. 8 is similar to that of FIG. 1 with the exception that the junction between flanges 14 and 16 is shaped at 66,68 so that the compressed elastic elements 30,32 will have parallel or substantially parallel surfaces 70,72 and 74,76 with part of the elastic elements accommodated in the gap between the flange 14 and the inertia member. The radial thickness of each element may thus be uniform or substantially uniform throughout its length and may be thinner than in constructions 1 to 7. When constructed in this manner the stiffness of the coupling between the hub 10 and the inertia mass 18,20 may be increased. The outer portion (not shown) of the damper of FIG. 8 may be similar to the outer portion of the damper shown in any one of FIGS. 1 to 7.

In FIG. 8 the elastic elements when in the free uncompressed state need not be in the form of O-rings. In FIGS. 1 to 7 the elastic elements are generally such that in this free uncompressed state they are in the form of O-rings.

I claim:

1. A torsional vibration damper comprising a hub member, an inertia member comprising at least two parts and being disposed about a peripheral portion of the hub member to define a cavity and a viscous fluid disposed in said cavity, each of said two parts of the inertia member being cut away in a region adjacent the hub member, and an elastic tuning element formed from a high resilience, low hysteresis material located in each said cut away portion in such manner that each said elastic element is under both axial and radial compressive stress to locate positively said inertia member both axially and radially relative to said hub member, and also acts as a seal between said hub member and said inertia member whereby to seal said viscous fluid in said cavity.

2. A damper according to claim 1, wherein said cavity contains a silicone fluid having a viscosity of up to 1 million centistokes.

3. A damper according to claim 1, wherein the tuning elements comprise a natural rubber having an outer surface layer of a synthetic rubber which is chemically inert to the damping fluid.

4. A damper according to claim 3, wherein the outer surface is approximately 0.005 inches thick.

5. A damper according to claim 1, wherein the inertia member is formed with a V cross-section groove so that the inertia member may serve as a pulley.

6. A damper according to claim 5, wherein the tuning elements are bonded in position.

* * * * *